United States Patent
Sengupta et al.

(10) Patent No.: US 9,965,459 B2
(45) Date of Patent: May 8, 2018

(54) PROVIDING CONTEXTUAL INFORMATION ASSOCIATED WITH A SOURCE DOCUMENT USING INFORMATION FROM EXTERNAL REFERENCE DOCUMENTS

(71) Applicant: Accenture Global Services Limited, Dublin (IE)

(72) Inventors: Shubhashis Sengupta, Bangalore (IN); Annervaz Karukapadath Mohamedrasheed, Trichur (IN); Neetu Pathak, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 512 days.

(21) Appl. No.: 14/489,693

(22) Filed: Sep. 18, 2014

(65) Prior Publication Data
US 2016/0042061 A1    Feb. 11, 2016

(30) Foreign Application Priority Data
Aug. 7, 2014    (IN) .......................... 3868/CHE/2014

(51) Int. Cl.
*G06F 17/30* (2006.01)
*G06F 17/27* (2006.01)

(52) U.S. Cl.
CPC .......... *G06F 17/278* (2013.01); *G06F 17/277* (2013.01); *G06F 17/2785* (2013.01)

(58) Field of Classification Search
CPC ........... G06F 17/2211; G06F 17/30277; G06F 17/30247; G06F 17/30705
USPC ........................................ 707/738, 739, 741
See application file for complete search history.

(56) References Cited

U.S. PATENT DOCUMENTS

| | | | | |
|---|---|---|---|---|
| 8,725,771 B2* | 5/2014 | Crochet | .............. | G06F 17/2211 707/790 |
| 9,171,018 B2* | 10/2015 | Ovsjanikov | ....... | G06F 17/30277 |
| 9,449,081 B2* | 9/2016 | Crouch | ............. | G06F 17/30616 |
| 9,454,602 B2* | 9/2016 | Misra | .................. | G06F 17/3071 |
| 9,489,350 B2* | 11/2016 | Crochet | ............. | G06F 17/2211 |
| 9,600,496 B1* | 3/2017 | Ovsjanikov | ....... | G06F 17/30277 |
| 2005/0226511 A1 | 10/2005 | Short | | |
| 2009/0063426 A1* | 3/2009 | Crouch | ............. | G06F 17/30616 |

(Continued)

OTHER PUBLICATIONS

Wikipedia, "Text Mining," http://en.wikipedia.org/w/index.php?title=Text_mining&oldid=613783408, Jun. 21, 2014, 9 pages.

*Primary Examiner* — Jean M Corrielus
(74) *Attorney, Agent, or Firm* — Harrity & Harrity, LLP

(57) ABSTRACT

A device may receive a source document to be processed for contextual information associated with named entities included in the source document. The device may identify a named entity included in the source document, and may identify a context of the source document. The device may identify a reference document associated with the named entity. The reference document may be different from the source document. The device may perform a semantic similarity analysis based on the context of the source document and further based on the reference document. The device may identify contextual information, included in the reference document, based on performing the semantic similarity analysis. The contextual information may relate to the context of the source document. The device may provide the contextual information.

20 Claims, 12 Drawing Sheets

(56) References Cited

U.S. PATENT DOCUMENTS

| | | | |
|---|---|---|---|
| 2009/0144609 A1 | 6/2009 | Liang et al. | |
| 2010/0070448 A1 | 3/2010 | Omoigui | |
| 2010/0279667 A1 | 11/2010 | Wehrs et al. | |
| 2011/0270606 A1* | 11/2011 | Crochet | G06F 17/2211 704/9 |
| 2011/0270888 A1* | 11/2011 | Crochet | G06F 17/2211 707/794 |
| 2011/0271232 A1* | 11/2011 | Crochet | G06F 17/2211 715/810 |
| 2011/0320437 A1 | 12/2011 | Kim et al. | |
| 2013/0085745 A1* | 4/2013 | Koister | G06F 17/2785 704/9 |
| 2015/0066939 A1* | 3/2015 | Misra | G06F 17/3071 707/739 |
| 2015/0120738 A1* | 4/2015 | Srinivasan | G06F 17/30598 707/739 |
| 2015/0154232 A1* | 6/2015 | Ovsjanikov | G06F 17/30277 707/780 |
| 2016/0203130 A1* | 7/2016 | Roque | G06F 17/30684 707/741 |

* cited by examiner

PROVIDING CONTEXTUAL INFORMATION ASSOCIATED WITH A SOURCE DOCUMENT USING INFORMATION FROM EXTERNAL REFERENCE DOCUMENTS

RELATED APPLICATION

This application claims priority to Indian Patent Application No. 3868/CHE/2014, filed on Aug. 7, 2014, the content of which is incorporated by reference herein in its entirety.

BACKGROUND

Text mining may refer to a process for deriving output information based on analyzing natural language text. The output information may be derived by devising patterns and trends using text analysis techniques, such as statistical pattern learning. Text mining may involve structuring the text (e.g., parsing, adding or removing derived linguistic features, etc.), deriving patterns within the structured text, and evaluating or interpreting the derived patterns to produce the output information. Examples of text mining include text categorization, text clustering, concept/entity extraction, production of granular taxonomies, sentiment analysis, document summarization, and entity relation modeling.

SUMMARY

According to some possible implementations, a device may receive a source document to be processed for contextual information associated with named entities included in the source document. The device may identify a named entity included in the source document, and may identify a context of the source document. The device may identify a reference document associated with the named entity. The reference document may be different from the source document. The device may perform a semantic similarity analysis based on the context of the source document and further based on the reference document. The device may identify contextual information, included in the reference document, based on performing the semantic similarity analysis. The contextual information may relate to the context of the source document. The device may provide the contextual information.

According to some possible implementations, a computer readable medium may store instructions that, when executed by a processor, cause the processor to receive a source document to be processed for contextual information relating to the source document. The instructions may cause the processor to identify a named entity included in the source document, and to identify a context associated with the source document. The instructions may cause the processor to identify a reference document based on the named entity. The reference document may be different from the source document. The instructions may cause the processor to perform a semantic similarity analysis using the context associated with the source document and further using the reference document. The instructions may cause the processor to identify contextual information, included in the reference document, based on performing the semantic similarity analysis. The contextual information may not be included in the source document. The instructions may cause the processor to provide the contextual information.

According to some possible implementations, a method may include receiving, by a device, a source document to be processed for contextual information relating to the source document. The method may include identifying, by the device, a named entity included in the source document, and determining, by the device, a context associated with the source document. The method may include receiving, by the device, a reference document associated with the named entity. The reference document may be different from the source document. The method may include performing, by the device, a semantic similarity analysis based on the context associated with the source document and further based on reference information included in the reference document. The method may include identifying, by the device, contextual information, included in the reference information, based on performing the semantic similarity analysis, and providing, by the device, the contextual information.

DETAILED DESCRIPTION

The following detailed description of example implementations refers to the accompanying drawings. The same reference numbers in different drawings may identify the same or similar elements.

An author of a source document (e.g., a document that includes text) may omit information, from the source document, that is important to understand the context of the source document. For example, the author may presume that a reader has enough background knowledge to understand the context of the source document, may accidentally omit contextual information that some readers may need to understand the context of the source document, may omit contextual information due to time constraints, etc. In these cases, a reader may have difficulty understanding the information included in the source document. Implementations described herein assist in automatically identifying contextual information associated with a document, and providing the contextual information so that a reader of the document may better understand the document.

Figure 1:
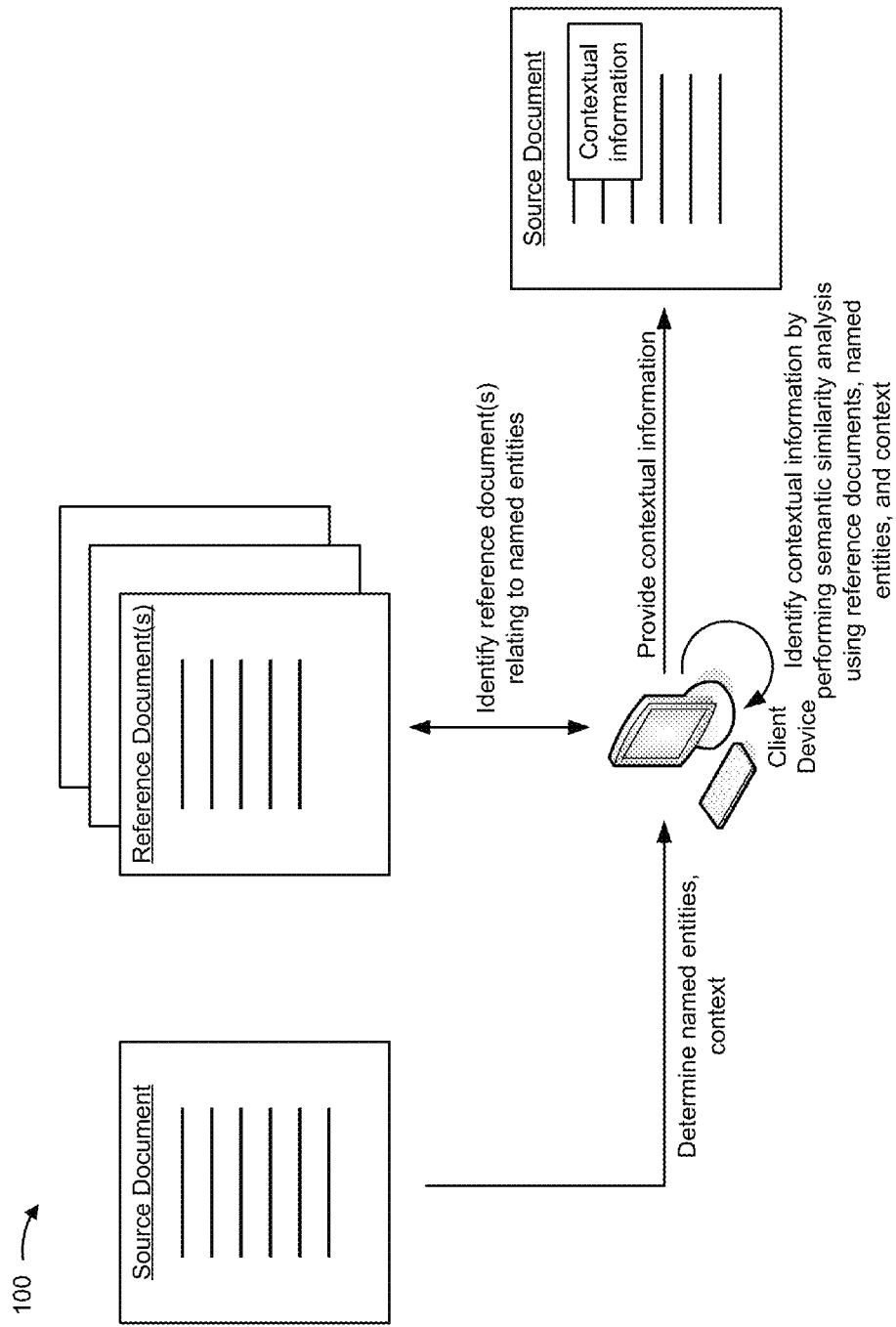
FIG. 1 is a diagram of an overview of an example implementation described herein.

FIG. 1 is a diagram of an overview of an example implementation 100 described herein. As shown in FIG. 1, a client device (e.g., a desktop computer, a laptop computer, a mobile phone, etc.) may receive a source document, such as a text document, a web page, a news article, etc. The client device may analyze the source document to determine named entities included in the source document (e.g., terms in the document that identify persons, organizations, locations, etc.), and to determine a context of the source document. As further shown, the client device may use the named entities to identify reference documents (e.g., encyclopedia entries, dictionary entries, web pages, etc.) associated with the named entities.

As further shown in FIG. 1, the client device may identify contextual information, associated with the source document, by performing a semantic similarity analysis using the reference documents, the named entities, and the context of the source document, as described in more detail elsewhere herein. For example, the client device may extract, from a reference document associated with a named entity, contextual information associated with the context of the source document. The client device may provide the contextual information. For example, the client device may provide the contextual information via a user interface that permits a user to navigate the contextual information, as described in more detail elsewhere herein. In this way, the client device may permit the user to better understand information included in the source document.

Figure 2:
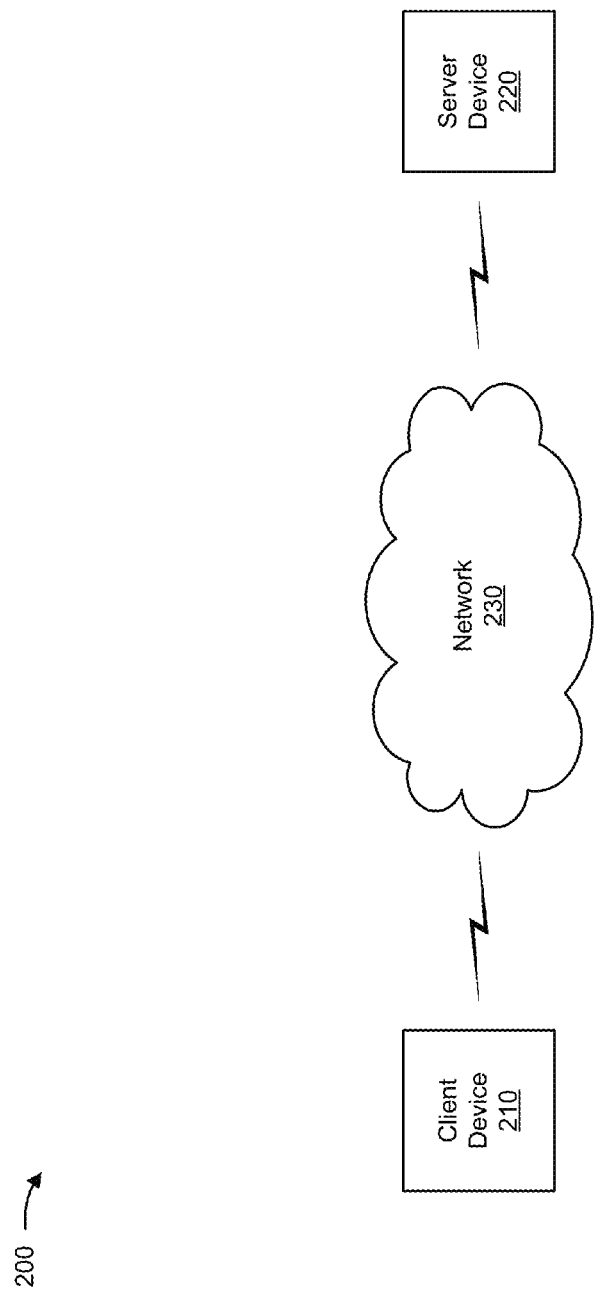
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 may include one or more devices capable of receiving, generating, storing, processing, and/or providing text and/or information associated with text (e.g., a source document, a reference document, contextual information, a named entity, a context, etc.). For example, client device 210 may include a computing device, such as a desktop computer, a laptop computer, a tablet computer, a server device, a mobile phone (e.g., a smart phone, a radiotelephone, etc.), or a similar device. In some implementations, client device 210 may receive a source document to be processed to determine contextual information associated with the source document, may process the source document to determine the contextual information, and may provide the contextual information. In some implementations, client device 210 may receive information from and/or transmit information to server device 220 (e.g., text and/or information associated with text).

Server device 220 may include one or more devices capable of receiving, generating, storing, processing, and/or providing text and/or information associated with text. For example, server device 220 may include a computing device, such as a server device, a desktop computer, a laptop computer, a tablet computer, or a similar device. Server device 220 may perform one, more, or all operations described elsewhere herein as being performed by client device 210.

Network 230 may include one or more wired and/or wireless networks. For example, network 230 may include a public land mobile network (PLMN), a local area network (LAN), a wide area network (WAN), a metropolitan area network (MAN), a telephone network (e.g., the Public Switched Telephone Network (PSTN)), a cellular network, a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
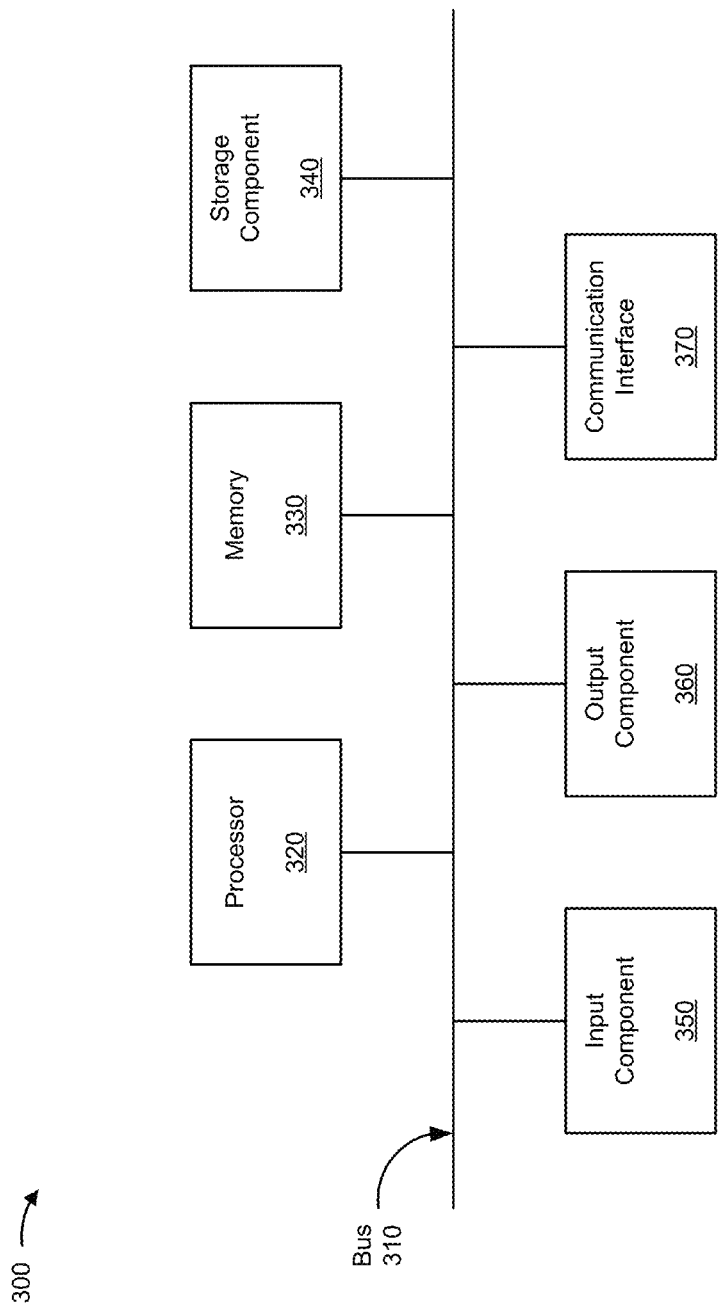
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
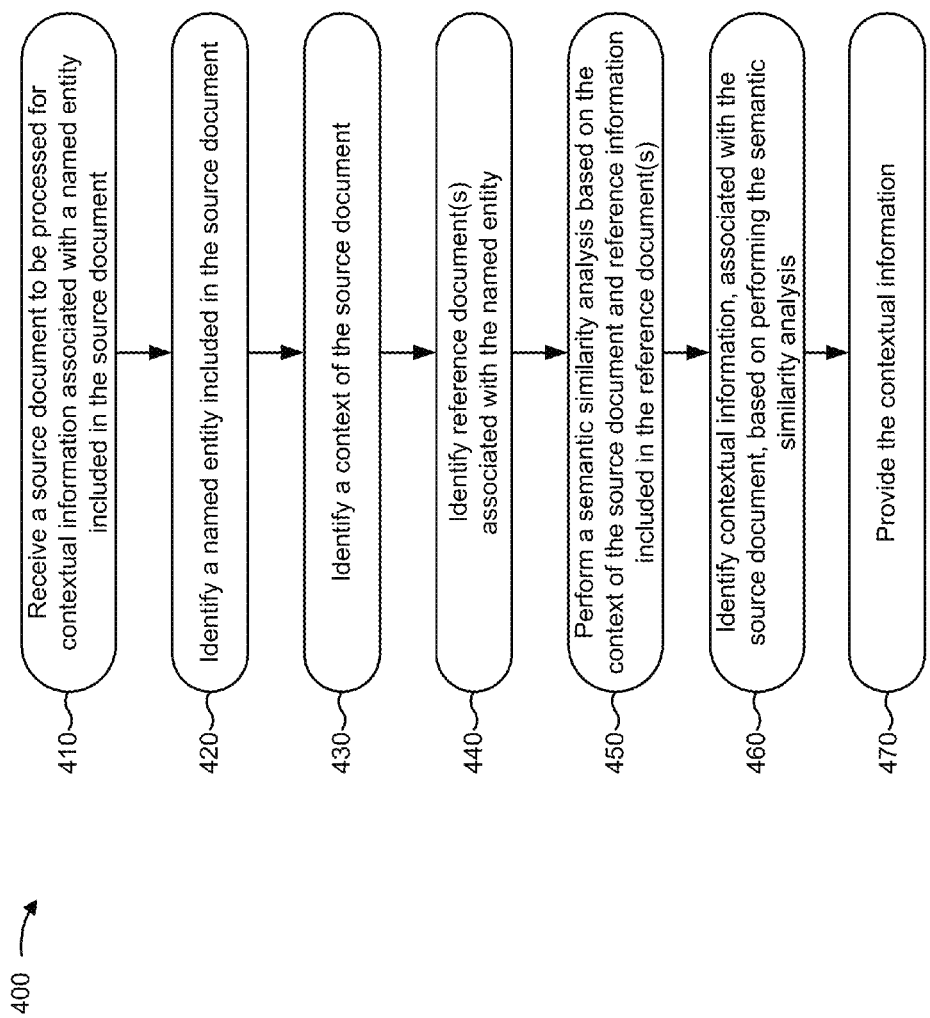
FIG. 4 is a flow chart of an example process for providing contextual information associated with a named entity in a source document.

FIG. 4 is a flow chart of an example process 400 for providing contextual information associated with a named entity in a source document. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving a source document to be processed for contextual information associated with a named entity included in the source document (block 410), and identifying a named entity included in the source document (block 420). For example, client device 210 may receive a source document to be processed for contextual information. In some implementations, client device 210 may receive, via input from a user and/or another device, information that identifies the source document. For example, a user may input information identifying the source document and/or a location from which the source document may be retrieved (e.g., a memory location, a uniform resource identifier that points to the source document, etc.). Client device 210 may obtain the source document based on this information. The source document may include, for example, a digital file (e.g., a file that includes text content, image content, audio content, video content, or the like), a web page, a text document, an article (e.g., an online news article, or a similar type of article), or the like.

The source document may include a named entity, in some implementations. A named entity may refer to a term in the source document that has been identified as a named entity based on applying a named entity recognition technique to the source document. A term may refer to a set of characters, such as a single character, multiple characters (e.g., a character string), a combination of characters (e.g., in a particular order) that form a word, a combination of characters that form multiple words (e.g., a multi-word term, such as a phrase, a sentence, a paragraph, etc.), a combination of characters that form an acronym, a combination of characters that form an abbreviation of a word, a combination of characters that form a misspelled word, etc. Client device 210 may analyze terms in the source document to identify named entities.

In some implementations, client device 210 may identify and/or categorize named entities included in the source document. A named entity may be categorized as, for example, a person, a place, an organization, a company, a country, a government, a location, an expression of time, a monetary value, a percentage, a quantity, or the like. Client device 210 may apply one or more named entity recognition techniques to determine the named entities, such as an entity identification technique, an entity chunking technique, an entity extraction technique, or the like. As an example, client device 210 may determine named entities by comparing terms in the source document to a list of named entity terms. As another example, client device 210 may use part-of-speech tags to identify named entities in the source document.

As further shown in FIG. 4, process 400 may include identifying a context of the source document (block 430). For example, client device 210 may analyze the source document to determine a context associated with the source document. A context may refer to, for example, a topic, a subject, a theme, etc. to which the source document relates. For example, a source document that includes the named entity "United States" could have a topic of sports (e.g., sporting events in the United States), politics (e.g., politics in the United States), economics (e.g., the United States economy), or the like. In some implementations, client device 210 may determine multiple contexts associated with the source document.

Client device 210 may determine the context of the source document by applying one or more context determination techniques to the source document, in some implementations. For example, client device 210 may use context terms in the source document, other than a particular named entity, to determine a context associated with the particular named entity. For example, client device 210 may identify a context of "politics" associated with the named entity "United States" in a source document if the source document includes a context noun of "government," "Congress," "voters," or the like, or a context verb of "voting," "elected," or the like. In some implementations, client device 210 may receive information that identifies context terms and contexts associated with the context terms. Additionally, or alternatively, client device 210 may apply a latent Dirichlet allocation (LDA) to identify and/or model a context of the source document (e.g., a theme, a topic, etc.).

As further shown in FIG. 4, process 400 may include identifying reference document(s) associated with the named entity (block 440). For example, client device 210 may identify one or more reference documents associated with the named entity. A reference document may include a document, other than the source document, that includes information associated with the named entity. For example, a reference document may include a web page (e.g., an encyclopedia web page, such as a Wikipedia web page), a digital file, a text document, an article, or the like.

In some implementations, client device 210 may identify a reference document by using the named entity as a search query. For example, client device 210 may input the named entity as a search query to an electronic encyclopedia, an electronic dictionary, a search engine, or the like. Client device 210 may identify one or more reference documents associated with a named entity, and/or may identify reference document(s) for multiple named entities (e.g., each named entity identified from the source document). Additionally, or alternatively, client device 210 may perform a search using the named entity as a search query (e.g., via a search engine), and may select a particular quantity of top search results as reference documents. Client device 210 may aggregate information (e.g., text information, image information, etc.) included in the one or more reference documents, associated with a named entity, to form reference information for the named entity.

As further shown in FIG. 4, process 400 may include performing a semantic similarity analysis based on the context of the source document and reference information included in the reference document(s) (block 450). For example, client device 210 may perform a semantic similarity analysis using the reference information and the context of the source document. Client device 210 may perform the semantic similarity analysis to generate a semantic similarity score that indicates a degree of semantic relatedness between the context (e.g., a topic, a context term, etc.) and a particular item of reference information (e.g., a text section of a reference document, such as a term, a sentence, etc.). Client device 210 may perform the semantic similarity analysis using, for example, an Adapted Lesk algorithm, a Jiang-Conrath algorithm, or the like.

As an example, assume that client device 210 determines that a source document includes the named entity "United States," and has a context of "politics." Further, assume that client device 210 uses the named entity "United States" to identify a reference document that includes a first text section of "The United States economy is the largest in the world" and a second text section of "The United States has a democratic form of government." Client device 210 may perform a semantic similarity analysis to determine that the second text section ("The United States has a democratic form of government") is more semantically related to the context of "politics" than the first text section. A text section may include, for example, a sentence, a line, a paragraph, a page, a document, etc.

As further shown in FIG. 4, process 400 may include identifying contextual information, associated with the source document, based on performing the semantic similarity analysis (block 460). For example, client device 210 may identify contextual information based on performing the semantic similarity analysis. In some implementations, the contextual information may include a subset of the reference information included in the reference document(s). As an example, client device 210 may identify, as contextual information, reference information associated with a semantic similarity score that satisfies a threshold. In this way, reference information that is more semantically related to the context of the source document may be included in the contextual information, while reference information that is less semantically related to the context of the source document may be excluded from the contextual information.

Additionally, or alternatively, client device 210 may identify, as contextual information, a particular quantity of text sections, included in the reference document(s), associated with the highest (or lowest) semantic similarity score(s). Additionally, or alternatively, client device 210 may calculate semantic similarity scores for different items of reference information (e.g., different text sections), and may identify the contextual information based on the semantic similarity scores (e.g., a particular quantity of highest scores, all scores above a threshold, a particular quantity of scores above a threshold, etc.).

As an example, client device 210 may calculate multiple semantic similarity scores, for a text section, based on multiple respective contexts determined for a source document. Client device 210 may combine the multiple semantic similarity scores to generate a combined semantic similarity score for the text section. In some implementations, client device 210 may apply different weight values to different contexts based on a degree to which a context is associated with the source document. Client device 210 may use a weight value, applied to a particular context, to weight a semantic similarity associated with the particular context when combining semantic similarity scores for a text section.

As further shown in FIG. 4, process 400 may include providing the contextual information (block 470). For example, client device 210 may provide the contextual information (e.g., for display, for storage, for analysis, to another device, etc.). The contextual information may relate to a named entity and a context associated with a source document. In some implementations, client device 210 may provide the contextual information in association with the source document.

As an example, a user may navigate to a website that includes a source document. Client device 210 may provide an input mechanism (e.g., a button, a link, etc.) that permits the user to cause client device 210 to identify and/or provide contextual information. Client device 210 may use the techniques described herein to identify contextual information associated with the source document, and may provide the contextual information for display (e.g., based on a user interaction with the input mechanism).

For example, assume that the named entity "United States" is included in a source document, and that client device 210 identifies contexts of "military," "economy," and "government type" for the source document. Client device 210 may display information that identifies the named entity ("United States") and the contexts ("military," "economy," and "government type"). In some implementations, client device 210 may display contextual information associated with the named entity and each context. Additionally, or alternatively, client device 210 may provide an input mechanism that permits a user to cause client device 210 to provide the contextual information for display. For example, a user may click on, may touch, may use a mouse to hover over, etc. information that identifies a context, such as "military," and client device 210 may provide contextual information, associated with the named entity ("United States") and the identified context ("military"), for display (e.g., "The United States has the world's largest military.").

In this way, a user may explore information associated with a source document to learn information not directly included in the source document. In this way, client device 210 may provide a user with a better understanding of content that the user is consuming. Furthermore, authors of source documents may not need to waste time providing background contextual information that may be discovered by client device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
FIGS. 5A-5C are diagrams of an example implementation relating to the example process shown in FIG. 4.
Figure 5B:
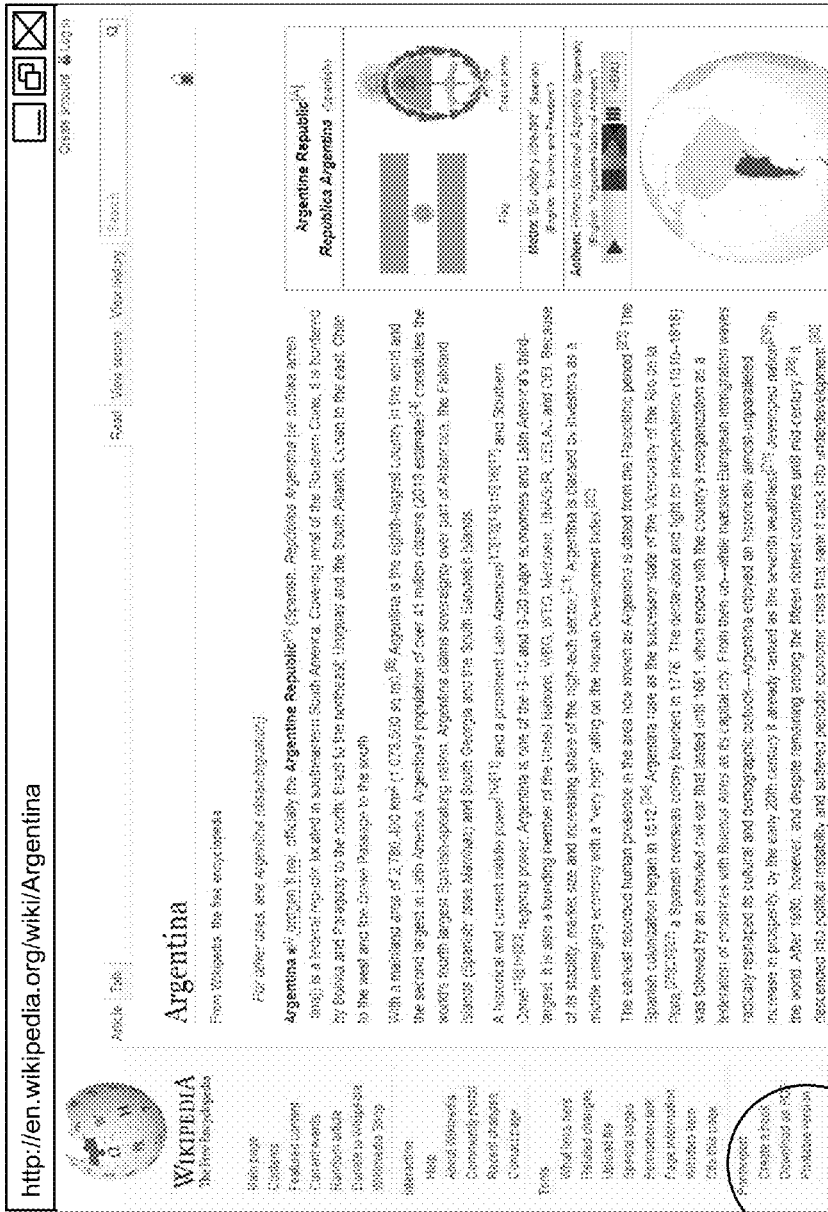
Figure 5C:
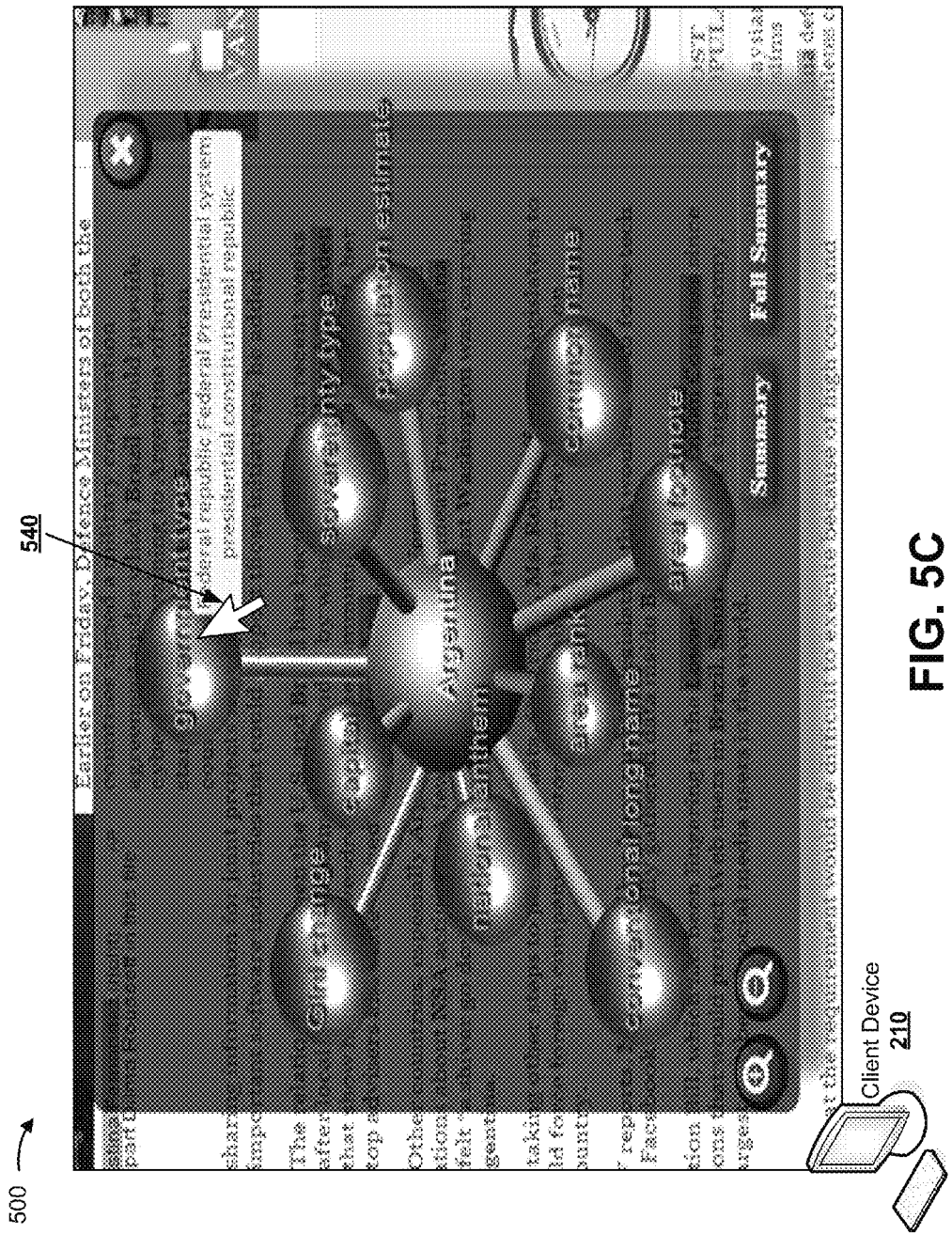

FIGS. 5A-5C are diagrams of an example implementation 500 relating to example process 400 shown in FIG. 4. FIGS. 5A-5C show an example of providing contextual information associated with a named entity in a source document.

As shown in FIG. 5A, assume that a user interacts with client device 210 to navigate to a website that includes a source document (e.g., source information). As shown, assume that the source document relates to an agreement between Argentina and Brazil. As shown by reference number 510, assume that client device 210 identifies several named entities in the source document, such as "Argentina,"

"Brazil," etc. As shown by reference number 520, assume that client device 210 identifies a context of "politics" for the source document. As shown by reference number 530, assume that the user interacts with an input mechanism associated with the named entity "Argentina" (e.g., clicks on the word "Argentina" in the text).

As shown in FIG. 5B, assume that client device 210 identifies a reference document by querying an online encyclopedia using the search query "Argentina." Assume that the reference document includes multiple text sections (e.g., sentences, phrases, etc.), and that client device 210 compares each text section to the context "politics" to calculate a semantic similarity score. Assume that client device 210 determines the text sections with semantic similarity scores that satisfy a threshold, and identifies a label for each of these text sections. Client device 210 may determine the label based on the context, in some implementations. Additionally, or alternatively, client device 210 may determine the label based on information included in the text section.

As shown in FIG. 5C, client device 210 may provide the labels for display in association with the named entity "Argentina." In some implementations, client device 210 may use a context as a label (e.g., may use a context noun included in the text, such as "capital," "government type," etc.). Additionally, or alternatively, client device 210 may determine a label based on the context and/or reference information associated with the label (e.g., "government type" may be determined based on the context of "politics" and the reference information of "Federal republic"). As shown by reference number 540, assume that the user interacts with a label of "government type." In this case, client device 210 may provide contextual information, associated with the "government type" label, for display. For example, client device 210 may provide contextual information shown as "Federal republic, Federal Presidential system, presidential constitutional republic."

In some implementations, client device 210 may provide a semantic relatedness indicator that indicates a semantic similarity score and/or a combined semantic similarity score associated with the contextual information (e.g., associated with a label). For example, client device 210 may provide, for display, circles associated with each label, and a size of the circle may represent a degree of semantic relatedness of the contextual information associated with the label. Additionally, or alternatively, labels closer to the named entity "Argentina" (e.g., closer to the center of the screen) may be associated with a higher semantic relatedness score than labels farther from the named entity. In this way, the user may be able to easily find the most relevant contextual information associated with the named entity and/or the source document.

As indicated above, FIGS. 5A-5C are provided merely as an example. Other examples are possible and may differ from what was described with regard to FIGS. 5A-5C.

Figure 6:
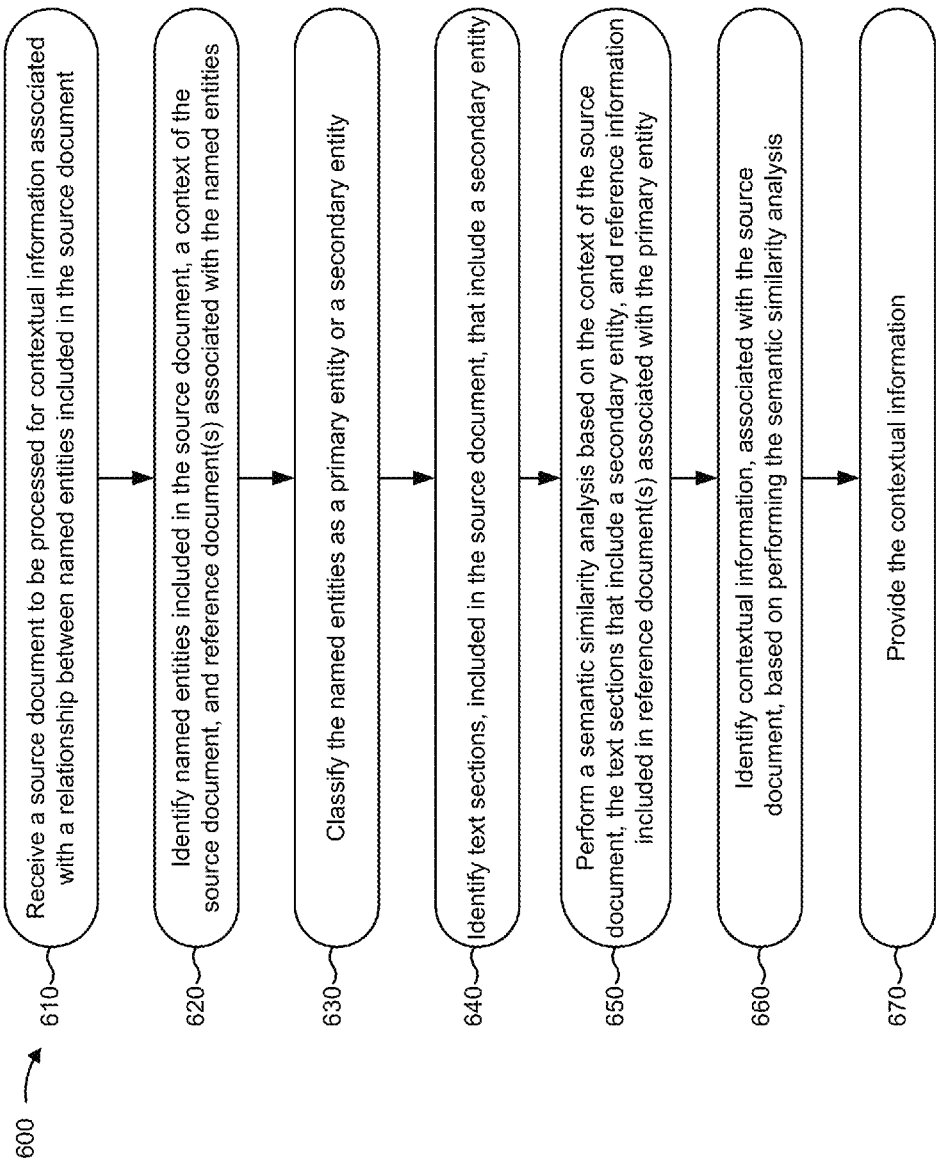
FIG. 6 is a flow chart of an example process for providing contextual information associated with a relationship between named entities in a source document.

FIG. 6 is a flow chart of an example process 600 for providing contextual information associated with a relationship between named entities in a source document. In some implementations, one or more process blocks of FIG. 6 may be performed by client device 210. In some implementations, one or more process blocks of FIG. 6 may be performed by another device or a group of devices separate from or including client device 210, such as server device 220.

As shown in FIG. 6, process 600 may include receiving a source document to be processed for contextual information associated with a relationship between named entities included in the source document (block 610). For example, client device 210 may receive a source document to be processed for contextual information, as described elsewhere herein in connection with block 410 of FIG. 4. Client device 210 may analyze the source document to determine a relationship between two or more named entities included in the source document, and may provide contextual information associated with the relationship. In some cases, the relationship between named entities may not be described in the source document. In this way, client device 210 may assist a reader in learning about the relationship between the named entities.

As further shown in FIG. 6, process 600 may include identifying named entities included in the source document, a context of the source document, and reference document(s) associated with the named entities (block 620). For example, the source document may include multiple named entities, and client device 210 may identify the named entities as described herein in connection with block 420 of FIG. 4. Additionally, or alternatively, client device 210 may analyze the source document to determine one or more contexts of the source document, as described herein in connection with block 430 of FIG. 4. Additionally, or alternatively, client device 210 may identify one or more reference documents associated with the multiple named entities, as described herein in connection with block 430 of FIG. 4. For example, client device 210 may determine one or more reference documents for each of the named entities (e.g., by using each of the named entities as search queries to identify the reference document(s)).

As further shown in FIG. 6, process 600 may include classifying the named entities as a primary entity or a secondary entity (block 630). For example, client device 210 may classify each named entity as a primary entity or a secondary entity. A primary entity may refer to a named entity that is a primary subject of the source document (e.g., the main focus of the source document), and a secondary entity may refer to a named entity that is a secondary subject of the source document (e.g., not the main focus of the source document). In some implementations, a source document may be associated with a single primary entity and one or more secondary entities. In this case, the primary entity may be the named entity that is most relevant to the subject matter of the source document.

In some implementations, client device 210 may use the reference document(s), associated with one or more named entities, to classify the named entities as a primary entity or a secondary entity. For example, client device 210 may use reference documents to calculate relevance scores for each named entity. In this case, client device 210 may classify the named entity with the highest (or lowest) relevance score as the primary entity, and may classify all other named entities as secondary entities.

As an example, client device 210 may generate a directed graph (e.g., a multigraph, where multiple edges are allowed between nodes of the graph) with the named entities as nodes in the graph. Client device 210 may use a reference document to calculate an edge value for an edge between two nodes (e.g., two names entities). Client device 210 may initialize the edge values by applying an initial edge value to a directed edge from a first named entity to a second named entity if the second named entity is included in (e.g., mentioned in) a reference document associated with the first named entity (e.g., the reference information, such as the text, of the reference document).

As an example, assume that a source document includes two named entities, "North America" and "United States." Further, assume that a reference document for "North America" includes the named entity "United States," and that a reference document for "United States" includes the named entity "North America." In this case, client device 210 may initialize an edge value (e.g., an initial relevance score) from "North America" to "United States" with an initial edge value of one, and may initialize an edge value from "United States" to "North America" with an initial edge value of one.

As another example, client device 210 may set the initial edge value equal to a quantity of times the second named entity is included in a reference document associated with the first named entity. For example, assume that a reference document for "North America" includes five instances (e.g., five mentions) of the named entity "United States," and that a reference document for "United States" includes one instance of the named entity "North America." In this case, client device 210 may initialize an edge value (e.g., an initial relevance score) from "North America" to "United States" with an initial edge value of five, and may initialize an edge value from "United States" to "North America" with an initial edge value of one.

Client device 210 may then determine, for a particular named entity, a total quantity of times that other named entities (other than the particular named entity) are included (e.g., mentioned) in a reference document associated with the particular named entity. Client device 210 may update initial edge values (e.g., initial relevance scores) by dividing each edge value, on an outgoing edge from the particular named entity to another named entity, by the total quantity.

For example, assume that a source document includes the named entities "Mexico" and "Canada" in addition to "North America" and "United States." Assume that "Mexico" is mentioned two times and "Canada" is mentioned three times in a reference document for "North America," and are each mentioned two times in a reference document for "United States." In this case, client device 210 determines that there are ten total mentions of named entities in the reference document for "North America" (five mentions for "United States," three mentions for "Canada," and two mentions for "Mexico"). Client device 210 may calculate an edge value of $5/10$ (e.g., 0.5) on the outgoing edge from "North America" to "United States," may calculate an edge value of $3/10$ (e.g., 0.3) on the outgoing edge from "North America" to "Canada," and may calculate an edge value of $2/10$ (e.g., 0.2) on the outgoing edge from "North America" to "Mexico."

Similarly, client device 210 may determine that there are five total mentions of named entities in the reference document for "United States" (e.g., one mention of "North America," two mentions of "Canada," and two mentions of "Mexico"). In this case, client device 210 may calculate an edge value of $1/5$ (e.g., 0.2) on the outgoing edge from "United States" to "North America," may calculate an edge value of $2/5$ (e.g., 0.4) on the outgoing edge from "United States" to "Canada," may calculate an edge value of $2/5$ (e.g., 0.4) on the outgoing edge from "United States" to "Mexico." Client device 210 may perform similar operations for the named entities "Canada" and "Mexico" by updating outgoing edge values from these named entities based on mentions of other named entities in reference documents for "Canada" and "Mexico." In this way, client device 210 may update outgoing edge values for all named entities included in the source document.

Client device 210 may determine the primary entity as the named entity with the lowest incoming edge value. Additionally, or alternatively, client device 210 may sum (or average) all incoming edge values for a named entity to calculate a relevance score for the named entity. Client device 210 may classify the named entity with the lowest relevance score as the primary entity for the source document, and may classify all other named entities as secondary entities for the source document.

Continuing with the example above, assume that an edge value on an incoming edge from "United States" to "North America" is 0.2, that an edge value on an incoming edge from "Canada" to "North America" is 0.1, that an edge value on an incoming edge from "Mexico" to "North America" is 0.1. In this case, client device 210 may calculate a relevance score of 0.4 (e.g., 0.2+0.1+0.1) for "North America." Assume that this is the lowest relevance score for all named entities. Thus, client device 210 identifies "North America" as the primary entity, and identifies "United States," "Canada," and "Mexico" as secondary entities.

As further shown in FIG. 6, process 600 may include identifying text sections, included in the source document, that include a secondary entity (block 640). For example, client device 210 may search the source document, using the secondary entities as search queries, to identify text sections of the source document that include (e.g., that mention) at least one secondary entity. In some implementations, a text section may include a sentence, and client device 210 may generate a list of all sentences that include a secondary entity.

As further shown in FIG. 6, process 600 may include performing a semantic similarity analysis based on the context of the source document, the text sections that include a secondary entity, and reference information included in reference document(s) associated with the primary entity (block 650). For example, client device 210 may identify a first set of text sections that mention a secondary entity in the source document (e.g., a set of source text sections), and may identify a second set of text sections included in the reference document for the primary entity (e.g., a set of reference text sections). Client device 210 may filter the first set of text sections and the second set of text sections to include only those text sections associated with a context of the source document. For example, client device 210 may perform a semantic similarity analysis between the text sections and the context to identify relevant text sections, as described herein in connection with blocks 450 and 460 of FIG. 4 (e.g., by determining text sections with a semantic similarity score that satisfies a threshold, etc.). By filtering the text sections to identify relevant text sections, client device 210 may form a set of filtered source text sections and a set of filtered reference text sections.

Client device 210 may calculate a semantic similarity score for a relationship between a primary entity and a secondary entity, in some implementations. For example, client device 210 may identify a set of filtered source text sections, from the source document, that mention the secondary entity in association with a context. Further, client device 210 may identify a set of filtered reference text sections, from a reference document associated with the primary entity, that are associated with the context. Client device 210 may compute a semantic similarity score between each filtered source text section and each filtered reference text section (e.g., using an Adapted Lesk algorithm, a Jiang-Conrath algorithm, a distance between terms according to a lexical database, such as Wordnet, etc.). Client device 210 may sum and/or may average these semantic similarity scores to determine an overall semantic similarity score between the primary entity and the secondary entity in association with a particular context.

Client device 210 may calculate this overall semantic similarity score between the primary entity and each secondary entity for each context of the source document. In this way, client device 210 may determine a degree to which the primary entity is related to respective secondary entities (e.g., in a particular context).

As further shown in FIG. 6, process 600 may include identifying contextual information, associated with the source document, based on performing the semantic similarity analysis (block 660). For example, client device 210 may identify contextual information based on performing the semantic similarity analysis. In some implementations, the contextual information may include a subset of the reference information included in the reference document(s). As an example, client device 210 may identify, as contextual information, a set of filtered reference text sections and/or a set of filtered reference text sections associated with a semantic similarity score that satisfies a threshold. In this way, reference information that is more semantically related to a secondary entity and a context of the source document may be included in the contextual information, while reference information that is less semantically related to the secondary entity and the context of the source document may be excluded from the contextual information.

Additionally, or alternatively, client device 210 may identify, as contextual information, a particular quantity of filtered reference text sections, included in the reference document(s), associated with the highest (or lowest) semantic similarity score(s). Additionally, or alternatively, client device 210 may calculate semantic similarity scores for different items of reference information (e.g., different reference text sections), and may identify the contextual information based on the semantic similarity scores (e.g., a particular quantity of highest scores, all scores above a threshold, a particular quantity of scores above a threshold, etc.).

As an example, client device 210 may calculate multiple semantic similarity scores, for a reference text section, based on multiple respective contexts determined for a source document. Client device 210 may combine the multiple semantic similarity scores to generate a combined semantic similarity score for the reference text section. In some implementations, client device 210 may apply different weight values to different contexts based on a degree to which a context is associated with the source document. Client device 210 may use a weight value, applied to a particular context, to weight a semantic similarity score associated with the particular context when combining semantic similarity scores for a text section.

As further shown in FIG. 6, process 600 may include providing the contextual information (block 670). For example, client device 210 may provide the contextual information (e.g., for display, for storage, for analysis, to another device, etc.). The contextual information may relate to a primary entity, a secondary entity, and a context associated with a source document. In some implementations, client device 210 may provide the contextual information in association with the source document. Additionally, or alternatively, client device 210 may provide, as contextual information, a semantic similarity score that indicates a degree of relatedness between a primary entity and a secondary entity (e.g., in a particular context).

As an example, a user may navigate to a website that includes a source document. Client device 210 may provide an input mechanism (e.g., a button, a link, etc.) that permits the user to cause client device 210 to identify and/or provide contextual information. Client device 210 may use the techniques described herein to identify contextual information associated with the source document, and may provide the contextual information for display (e.g., based on a user interaction with the input mechanism).

In some implementations, client device 210 may display contextual information associated with a primary entity, a secondary entity, and a context. Additionally, or alternatively, client device 210 may provide an input mechanism that permits a user to cause client device 210 to provide the contextual information for display. For example, a user may click on, may touch, may use a mouse to hover over, etc. a label that identifies a secondary entity, and client device 210 may provide contextual information, associated with the secondary entity in relation to the primary entity and the context.

In this way, a user may explore information associated with a source document to learn information, associated with relationships between named entities, that is not directly included in the source document. In this way, client device 210 may provide a user with a better understanding of content that the user is consuming. Furthermore, authors of source documents may not need to waste time providing background contextual information that may be discovered by client device 210.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of providing contextual information associated with a relationship between named entities in a source document.

Figure 7A:
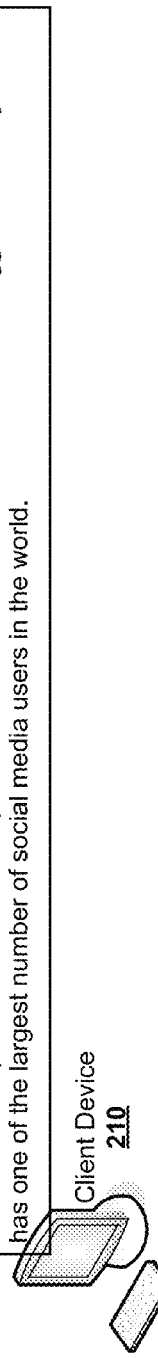
FIGS. 7A-7D are diagrams of an example implementation relating to the example process shown in FIG. 6.

As shown in FIG. 7A, assume that a user interacts with client device 210 to navigate to a website that includes a source document (e.g., source information). As shown, assume that the source document relates to an agreement between Argentina and Brazil. As shown by reference number 710, assume that client device 210 identifies several named entities in the source document, such as "Argentina," "Brazil," "South America," etc. As shown by reference number 720, assume that client device 210 identifies a context of "politics" for the source document. As shown by reference number 730, assume that the user interacts with an input mechanism to cause client device 210 to determine and provide contextual information associated with relationships between named entities in the source document.

Figure 7B:
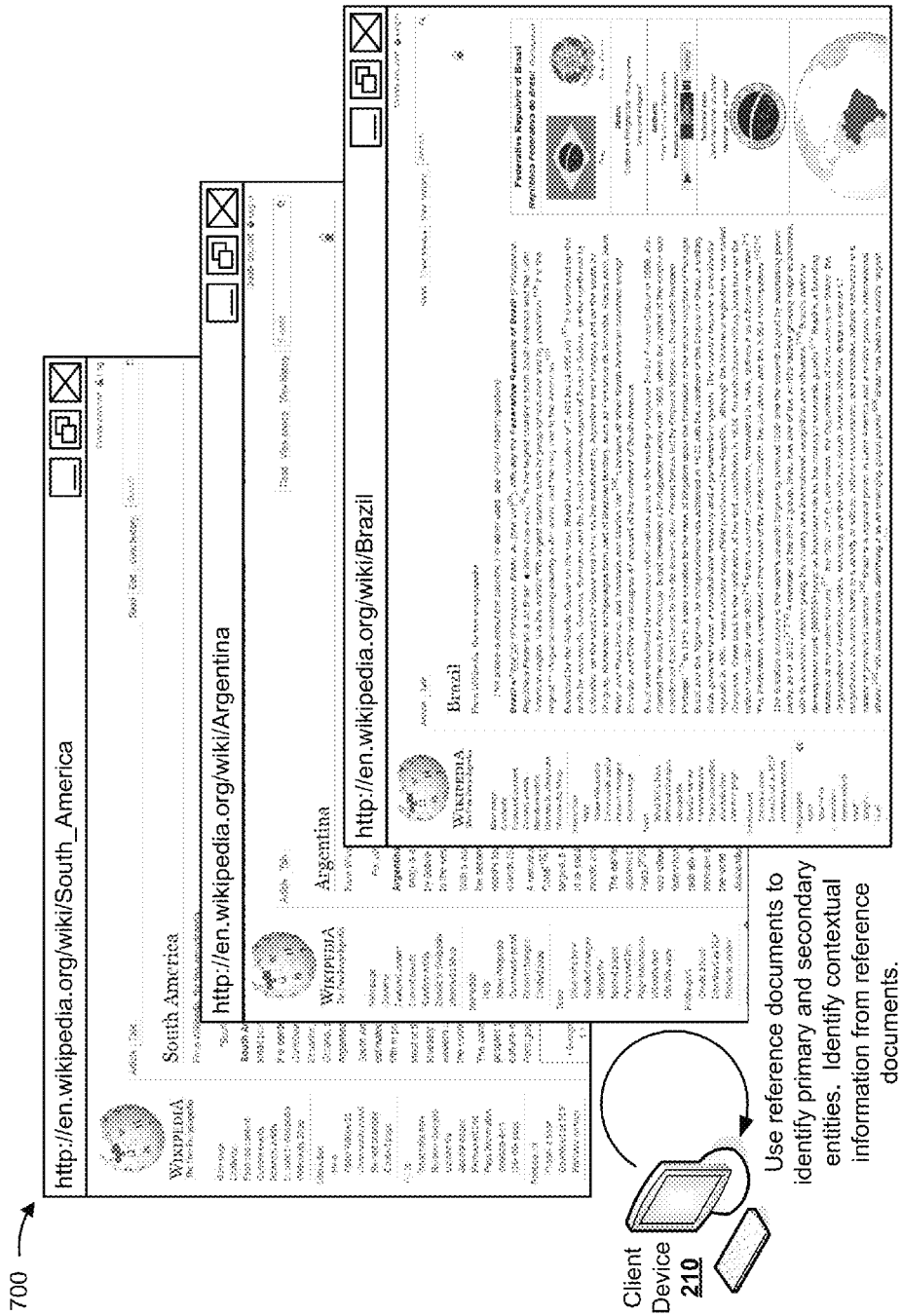

As shown in FIG. 7B, assume that client device 210 identifies reference documents for each named entity by querying an online encyclopedia using the search query "South America," "Argentina," "Brazil," etc. Assume that client device 210 uses the reference documents to classify "South America" as a primary entity, and to classify "Argentina," "Brazil," etc. as secondary entities, as described elsewhere herein. Further, assume that client device 210 performs a semantic similarity analysis to identify text sections, from the reference documents, that include contextual information relating to a relationship between "South America" and the secondary entities (e.g., in the context of "politics"), as described elsewhere herein.

Figure 7C:
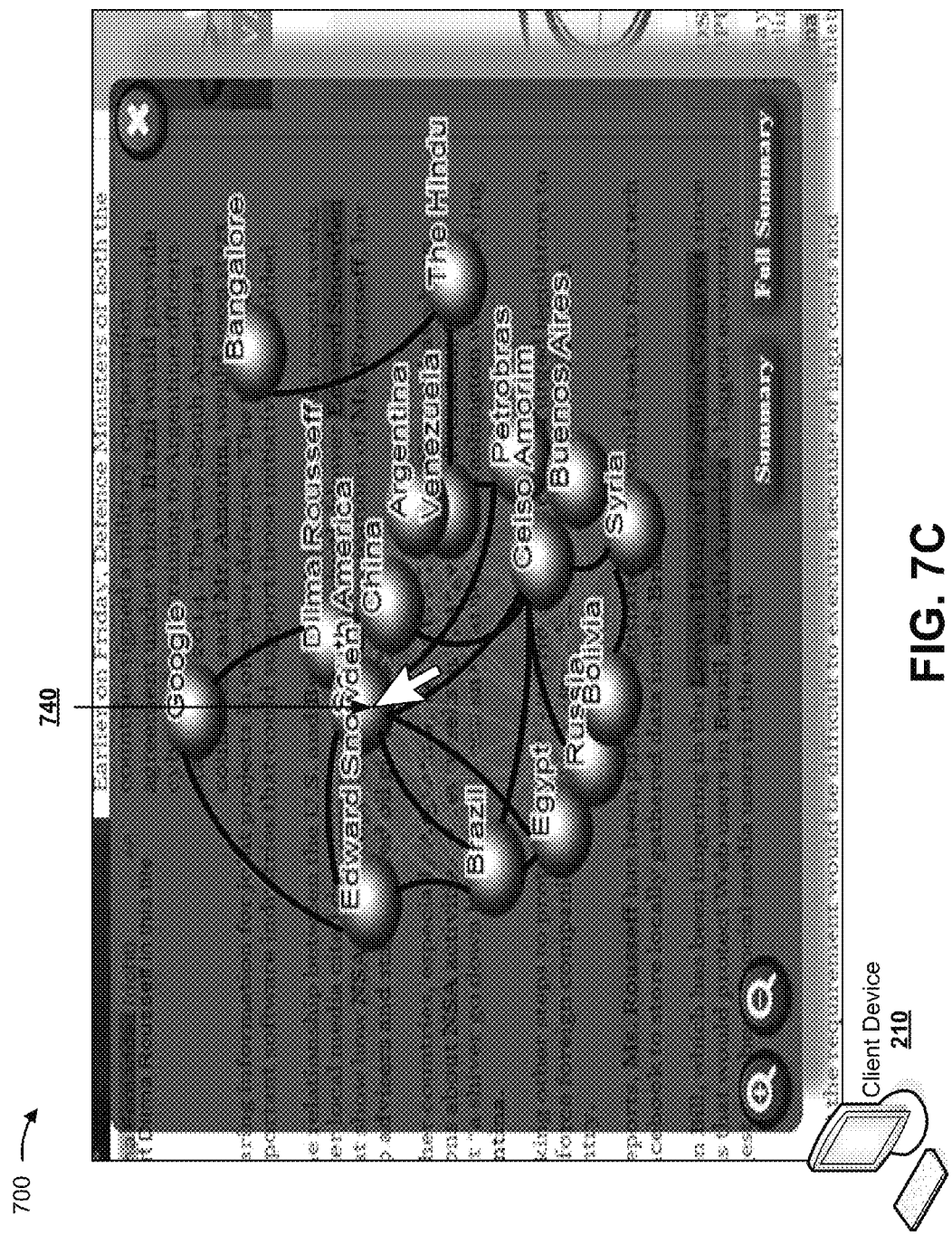

As shown in FIG. 7C, client device 210 may provide, for display, information that identifies the named entities, such as "South America," "Argentina," "Brazil," etc. In some implementations, client device 210 may display a graph that includes the named entities as nodes, and that indicates edges for named entities that share a relationship (e.g., as determined based on a semantic similarity score between named entities).

In some implementations, client device 210 may display edges between named entities that share a relationship associated with a semantic similarity score that satisfies a threshold. Additionally, or alternatively, client device 210 may provide an indication of the semantic similarity score and/or a degree of relatedness between named entities. For example, a user may interact with a displayed edge (e.g., by clicking, hovering a cursor over, etc.) to cause client device 210 to provide the semantic similarity scores associated with the edge (e.g., between the named entities connected by the edge). In this way, the user may determine the strength of a relationship between named entities. Additionally, or alternatively, client device 210 may display edges in a manner that indicates the semantic similarity score. For example, edges associated with a higher semantic similarity score may be displayed thicker, in a different color, etc. than edges associated with a lower semantic similarity score. In this way, the user may determine the strength of a relationship between named entities simply by looking at the graph.

In some implementations, a user may interact with a node and/or an edge to cause client device 210 to provide contextual information associated with the node and/or the edge (e.g., a named entity represented by the node, a relationship between named entities associated with an edge, etc.). For example, the user may hover a cursor over a node to cause client device 210 to display contextual information associated with the node (e.g., as described herein in connection with FIG. 5C). In this way, the user may easily view contextual information to better understand the source document and/or the named entity. As another example, the user may hover a cursor over an edge to cause client device 210 to display contextual information associated with a relationship between two nodes connected by the edge (e.g., determined as described herein in connection with FIG. 6). In this way, the user may easily view contextual information to better understand a relationship between named entities included in the source document.

Additionally, or alternatively, a user may interact with a node to cause client device 210 to display a graph associated with that node. For example, assume that the user interacts with a node for the named entity "South America," as shown by reference number 740.

Figure 7D:
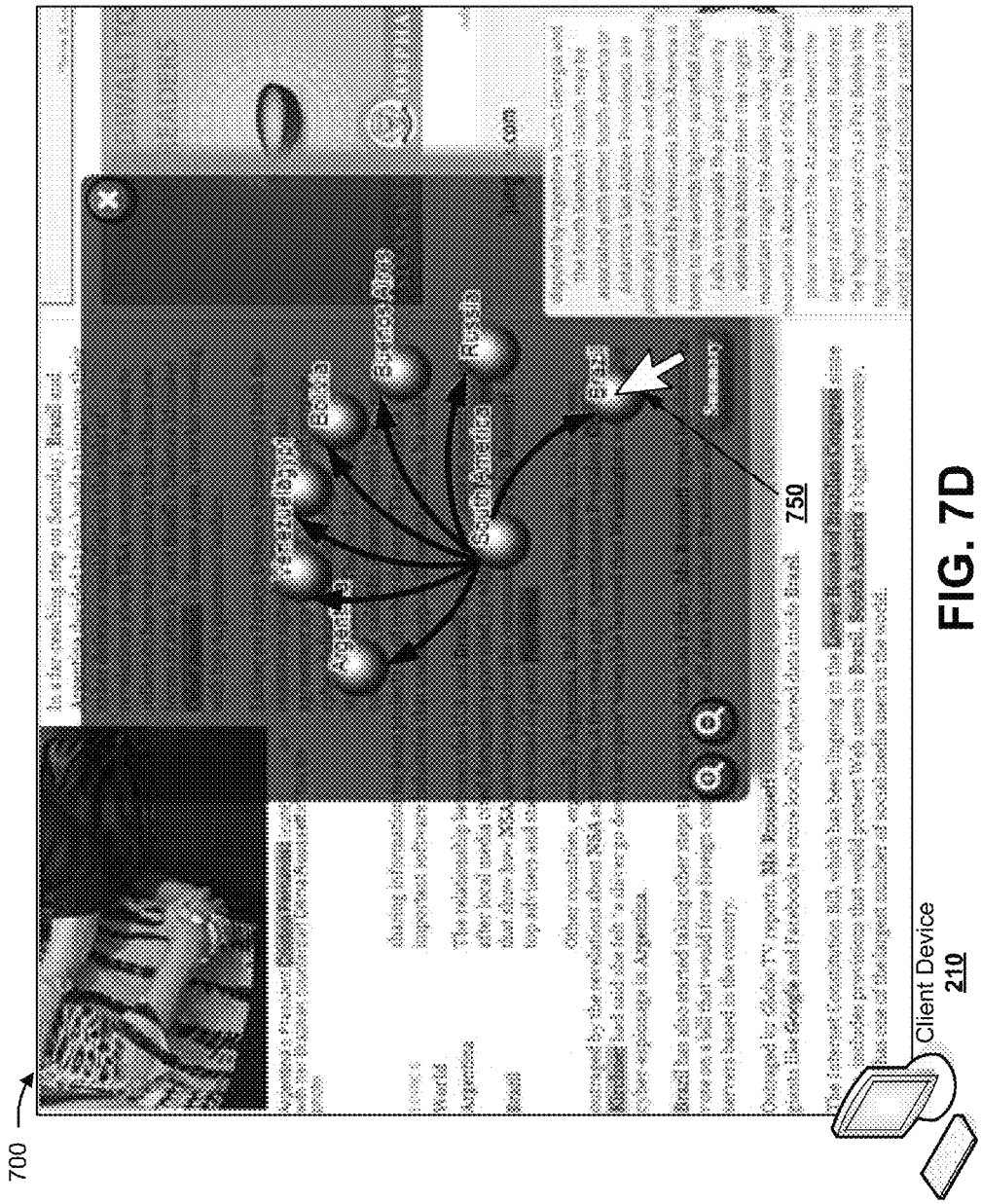

As shown in FIG. 7D, user interaction with the "South America" node may cause client device 210 to display a graph associated with the "South America" node. For example, client device 210 may show (e.g., may display) nodes that are directly connected to "South America," and may hide (e.g., may not display) nodes that are not directly connected to "South America," as shown. Additionally, or alternatively, client device 210 may provide edges between the displayed nodes. Client device 210 may display only outgoing edges from the "South America" node, only incoming edges to the "South America" node, or both incoming and outgoing edges associated with the "South America" node.

The user may interact with the nodes and edges as described elsewhere herein. For example, the user may interact with a node and/or an edge to cause client device 210 to provide contextual information associated with a relationship between "South America" and another displayed node, as shown by reference number 750. As an example, if the context is "political," the contextual information may indicate a relationship between "South America" and "Argentina" as "Argentina is a federal republic, and the second largest country in South America." As another example, if the context of the source document is "economic," the contextual information may indicate a relationship between "South America" and "Argentina" as "Argentina is the third largest economy in South America." In this way, the user may be able to easily find the most relevant contextual information associated with named entities and/or the source document.

As indicated above, FIGS. 7A-7D are provided merely as an example. Other examples are possible and may differ from what was described with regard to FIGS. 7A-7D.

Implementations described herein assist in automatically identifying contextual information associated with a document, and providing the contextual information so that a reader of the document may better understand the document.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a source document to be processed for contextual information associated with one or more named entities included in the source document;
provide, for display on a representation of the source document on a user interface, a first input mechanism for a user;
identify, based on a first user interaction with the first input mechanism, a first named entity, of the one or more named entities, included in the source document;
identify, based on a second user interaction with the first input mechanism, a context of the source document by using context terms, of the source document, that are different than the first named entity;
provide the first named entity as a search query;
identify a first reference document based on providing the first named entity as the search query,
the first reference document being associated with a result of the search query, and
the first reference document being different from the source document;
identify a second named entity, of the one or more named entities, included in the source document;
identify a second reference document associated with the second named entity;
analyze the first reference document and the second reference document;
classify the first named entity as a primary entity based on analyzing the first reference document and the second reference document;
classify the second named entity as a secondary entity based on analyzing the first reference document and the second reference document;
perform a semantic similarity analysis based on the context of the source document and based on classifying the first named entity as the primary entity and the second named entity as the secondary entity;
provide, for display on the user interface, a second input mechanism for the user to cause contextual information to be provided; and
identify contextual information, associated with the source document, based on performing the semantic similarity analysis and based on a third user interaction with the second input mechanism,
the contextual information including one or more reference text sections having a threshold semantic similarity score with respect to the secondary entity and the context of the source document.

2. The device of claim 1, where the one or more processors, when performing the semantic similarity analysis, are to:
generate a semantic similarity score for a relationship between the context of the source document and a text section included in the first reference document; and
where the one or more processors, when identifying the contextual information, are to:
identify the text section as contextual information based on the semantic similarity score.

3. The device of claim 2, where the semantic similarity score indicates a degree of semantic relatedness between the context of the source document and the text section.

4. The device of claim 1, where the one or more processors are further to:
provide, for display, the contextual information in association with the source document.

5. The device of claim 1, where the one or more processors are further to:
provide, for display, an indication of a relationship between the contextual information and the first named entity.

6. The device of claim 1, where the one or more processors are further to:
calculate one or more relevance scores for the first named entity; and
where, when classifying the first named entity as the primary entity, the one or more processors are to:
classify the first named entity as the primary entity based on calculating the one or more relevance scores for the first named entity.

7. The device of claim 1, where the one or more processors are further to:
calculate one or more relevance scores for the second named entity; and
where, when classifying the second named entity as the secondary entity, the one or more processors are to:
classify the second named entity as the secondary entity based on calculating the one or more relevance scores for the second named entity.

8. A computer-readable medium storing instructions, the instructions comprising:
one or more instructions that, when executed by one or more processors, cause the one or more processors to:
receive a source document to be processed for contextual information relating to the source document;
provide, for display on a representation of the source document on a user interface, a first input mechanism for a user;
identify, based on a first user interaction with the first input mechanism, a first named entity included in the source document;
identify, based on a second user interaction with the first input mechanism, a context associated with the source document by using context terms, of the source document, that are different than the first named entity;
provide the first named entity as a search query;
identify a first reference document based on providing the first named entity as the search query,
the first reference document being associated with a result of the search query, and
the first reference document being different from the source document;
identify a second named entity included in the source document;

identify a second reference document associated with the second named entity;

analyze the first reference document and the second reference document;

classify the first named entity as a primary entity based on analyzing the first reference document and the second reference document;

classify the second named entity as a secondary entity based on analyzing the first reference document and the second reference document;

perform a semantic similarity analysis using the context associated with the source document and based on classifying the first named entity as the primary entity and the second named entity as the secondary entity;

provide, for display on the user interface, a second input mechanism for the user to cause contextual information to be provided; and identify contextual information, based on performing the semantic similarity analysis and based on a third user interaction with the second input mechanism, the contextual information including one or more reference text sections having a threshold semantic similarity score with respect to the secondary entity and the context associated with the source document, and not being included in the source document.

9. The computer-readable medium of claim 8, where the one or more instructions, that cause the one or more processors to perform the semantic similarity analysis, cause the one or more processors to:

generate a semantic similarity score for a relationship between the context associated with the source document and reference information included in the first reference document or the second reference document;

where the one or more instructions, when executed by the one or more processors, further cause the one or more processors to:

determine that the semantic similarity score satisfies the threshold semantic similarity score; and where the one or more instructions, that cause the one or more processors to identify the contextual information, cause the one or more processors to:

identify the reference information as contextual information based on determining that the semantic similarity score satisfies the threshold.

10. The computer-readable medium of claim 8, where the one or more instructions, when executed by the one or more processors, further cause the one or more processors to:

classify the first named entity as the primary entity based on a quantity of times that the first named entity is included in the second reference document.

11. The computer-readable medium of claim 10, where the one or more instructions, that cause the one or more processors to classify the first named entity, cause the one or more processors to:

classify the first named entity as the primary entity further based on a quantity of times that the second named entity is included in the first reference document.

12. The computer-readable medium of claim 8, where the one or more instructions, that cause the one or more processors to identify the contextual information, cause the one or more processors to:

identify the contextual information based on a plurality of relationships between the first named entity and the second named entity.

13. The computer-readable medium of claim 8, where the one or more instructions, that cause the one or more processors to perform the semantic similarity analysis, cause the one or more processors to:

perform at least one of:
an Adapted Lesk algorithm, or
a Jiang-Conrath algorithm.

14. The computer-readable medium of claim 8, where the one or more instructions, when executed by the one or more processors, further cause the one or more processors to:

calculate a relevance score for the first named entity and a relevance score for the second named entity; and where the one or more instructions, that cause the one or more processors to classify the first named entity as the primary entity, cause the one or more processors to:

classify the first named entity as the primary entity based on the first named entity having a higher relevance score than the second named entity.

15. A method, comprising:

receiving, by a device, a source document to be processed for contextual information relating to the source document;

providing, by the device and for display on a representation of the source document on a user interface, a first input mechanism for a user;

identifying, by the device and based on a first user interaction with the first input mechanism, a first named entity included in the source document;

determining, by the device and based on a second user interaction with the first input mechanism, a context associated with the source document by using context terms, of the source document, that are different than the first named entity;

providing, by the device, the first named entity as a search query;

receiving, by the device, a first reference document based on providing the first named entity as the search query, the first reference document being associated with a result of the search query, and the first reference document being different from the source document;

identifying, by the device, a second named entity included in the source document;

identifying, by the device, a second reference document associated with the second named entity;

analyzing, by the device, the first reference document and the second reference document;

classifying, by the device, the first named entity as a primary entity based on analyzing the first reference document and the second reference document;

classifying, by the device, the second named entity as a secondary entity based on analyzing the first reference document and the second reference document;

performing, by the device, a semantic similarity analysis based on the context associated with the source document and based on classifying the first named entity as the primary entity and the second named entity as the secondary entity; and identifying, by the device, contextual information, associated with the source document, based on performing the semantic similarity analysis and based on a third user interaction with a second input mechanism, the contextual information including one or more reference text sections having a threshold semantic similarity score with respect to the secondary entity and the context associated with the source document.

16. The method of claim 15, further comprising:
identifying a third named entity included in the source document,
the third named entity being different from the first named entity and the second named entity; and
identifying a text section, included in the source document, that includes the third named entity; and
where performing the semantic similarity analysis comprises:
performing the semantic similarity analysis using the text section that includes the third named entity.

17. The method of claim 15, further comprising:
identifying a third named entity included in the source document,
the third named entity being different from the first named entity and the second named entity; and
receiving a third reference document associated with the third named entity,
the third reference document being different from the first reference document, the second reference document, and the source document; and
where performing the semantic similarity analysis comprises:
performing the semantic similarity analysis using the third reference document.

18. The method of claim 15, where performing the semantic similarity analysis comprises:
determining a source text section, included in the source document, that is associated with the context associated with the source document;
determining a reference text section, included in the first reference document and the second reference document, that is associated with the context associated with the source document; and
determining a score associated with the source text section and the reference text section.

19. The method of claim 15,
where the method further comprises:
providing contextual information associated with a relationship between the first named entity and the second named entity.

20. The method of claim 15, where performing the semantic similarity analysis comprises:
generating a semantic similarity score associated with the first named entity and the second named entity; and
where the method further comprises:
providing a visual indication of the semantic similarity score.

* * * * *